United States Patent
Floden

[11] 3,765,586
[45] Oct. 16, 1973

[54] FILM HANDLING APPARATUS
[75] Inventor: Bjorn Fritjof Floden, Palmyra, N.J.
[73] Assignee: RCA Corporation, New York, N.Y.
[22] Filed: Nov. 26, 1971
[21] Appl. No.: 202,352

[52] U.S. Cl. .................................................. 226/84
[51] Int. Cl. ............................................. G03b 1/24
[58] Field of Search ................. 226/82, 83, 84, 91, 226/114, 183; 352/157, 159, 158

[56] References Cited
UNITED STATES PATENTS
3,150,810  9/1964  Heaton ............................. 226/82 X FOREIGN PATENTS OR APPLICATIONS
866,906   2/1953   Germany ........................... 226/114

Primary Examiner—Allen N. Knowles
Assistant Examiner—Gene A. Church
Attorney—Edward J. Norton and Eugene M. Whitacre

[57] ABSTRACT

Apparatus for automatically providing film forming and guiding of a film in desired operative relation with a film transport assembly. This is accomplished through a position programmed member which is movable with respect to the elements of the film transport assembly.

6 Claims, 2 Drawing Figures

FILM HANDLING APPARATUS

The present invention relates to film transport systems of the type, for example, utilized in motion picture film projectors. More particularly, the invention concerns a novel and simplfied arrangement of a film forming device, which automatically disposes and guides the film in desired operative projection relation with the transport mechanism.

When preparing to operate a film projector apparatus, it is necessary to thread the film from a film supply device through various portions of the apparatus. When the apparatus is a motion picture projector, the film must be threaded from the supply device between a sprocket wheel and its film maintaining shoe and through a film gate device. In addition, for proper operation of the film through the gate device, a loop of film must be provided between the film gate and the sprocket wheel. Manual threading operation takes time, a certain amount of skill and may involve damage to the film.

While automatic film threaders are known, prior art devices do not easily lend themselves to the rapid film threading operation which the present invention will make possible. They usually employ curved channel sections, of which some are movable, to guide the film into the projector film transport path. The speed of the threading operation is limited by the speed at which the intermittent feed mechanism at the film gate, and the metering sprockets can be run.

The present arrangement simplifies the film feed-in path to a straight, comparatively wide, almost vertical chute. The leading end of the film is rapidly fed between the aperture plate and film shoe and in front of the movable retracted threading members of the film transport mechanism including the loop forming film guide roller. After the rapid film feed in, the film gate is closed and the retracted threading members are quickly extended to position the film for the projection run.

In accordance with one emboidment of the present invention, there is provided a film projector transport having first means adapted to receive a supply of film. Film gate means are spaced from the first means including an aperture plate means and film shoe means arranged to hold said film therebetween, and rotatable annular sprocket means are disposed intermediate the film supply means and said film gate means. A film, when present, is disposed in a first region extending from said film supply means to said film gate means and situated on a given side of and in spaced relation with said sprocket means. Apparatus for automatically disposing film from said supply in operative projection relation with said transport means is provided. This appartus comprises film guide means including means adapted to cooperate with said sprocket means to maintain coaction with said sprocket means. Means are provided for movably mounting said guide means to traverse a continuous path which includes a first position situated on said given side of said sprocket means beyond said first region, a second position intermediate said sprocket means and said film gate means in which said guide means is substantially tangent the periphery of said sprocket means, and a further position to the side of the sprocket means opposite said given side. Control means are coupled to said mounting means for positioning said guide means along said path. Said control means are operative to sequentially move said guide means from said first position through said second position to said further position, to thereby dispose said film when in said first region about said sprocket means and further to form a loop of said film between said sprocket means and said film gate means. Said control means is further operative to move said guide means from said further position back to said second position wherein said guide means is then disposed in said cooperative relation with said sprocket means.

The invention will be described in greater detail by reference to the accompanying drawing in which.

Figure 1:
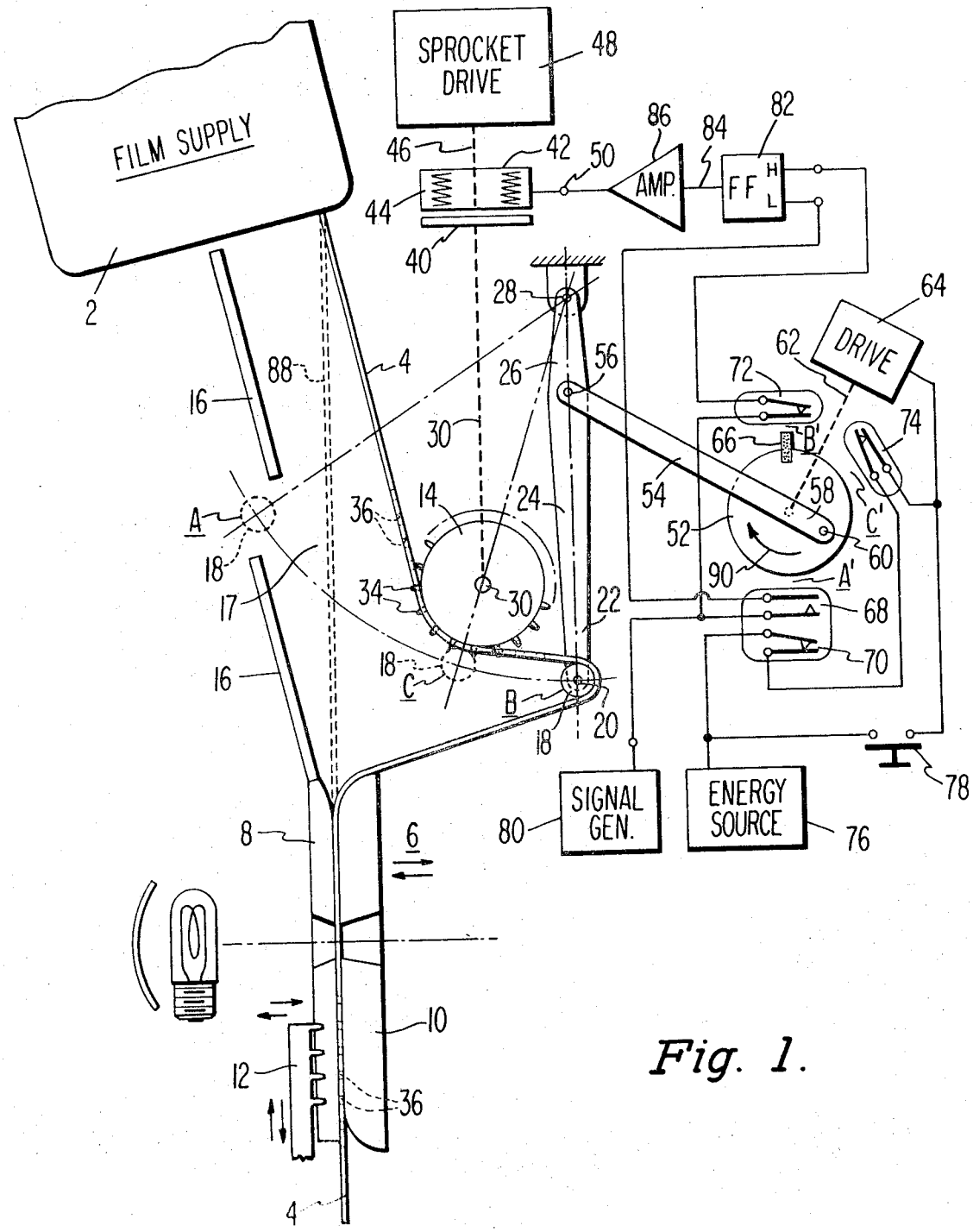
FIG. 1 is a partial schematic, partial diagrammatic plan view of one embodiment of the invention.

In FIG. 1 there is shown a film supply device 2, which for example may comprise a cartridge, including a reel not shown from which a given length of a film 4 may be paid out. In spaced relation to the film supply 2 is a film gate assembly 6, which includes an aperture plate 8 and a film shoe 10. The aperture plate 8 and film shoe 10 are arranged in yieldable urging relation, by means not shown, for holding a portion of the film 4 therebetween. An intermittently operable claw device 12 is provided for moving the film 4 through the film gate assembly 6. Intermediate the film gate assembly 6 and the film supply device 2, there is mounted a rotatable sprocket wheel 14 in spaced relation with a pair of wall-like members 16. The members 16 with the sprocket wheel 14 define a region 17 therebetween for the film 4, extending between the film supply 2 and the film gate assembly 6.

A film guide roller 18 is mounted for rotation about a pin 20 disposed at an end portion 22 of an elongated arm 24. The arm 24 is pivotally mounted at its other end portion 26, by means of a pin like member 28 which is in spaced relation to the sprocket wheel 14. The length of the arm 24 and the spaced location of its pivot axis 28 with respect to the sprocket wheel 14 is arranged, to provide travel of the roller 18 along an arcuate path intermediate the sprocket wheel 14 and the film gate assembly 6, when the arm 24 is rotated about its pivot point 28. As shown in FIG. 1, the arcuate path for the roller 18 includes extreme positions denoted by he letters A and B respectively, and a further position C which is intermediate the positions A and B. As shown, the roller 18 when in the position A is disposed to one side of the sprocket wheel 14 and beyond the film region 17. Roller 18 when in the position denoted B is disposed to the other side and beyond the sprocket wheel 14. The roller 18 when disposed in the position denoted C is disposed substantially tangent to the peripheral surface of the annular sprocket wheel 14. The roller 18 when disposed in position C is thus operative to serve as a sprocket shoe, for maintaining the film 4 in proper cooperative relation with the sprocket wheel 14.

Figure 2:
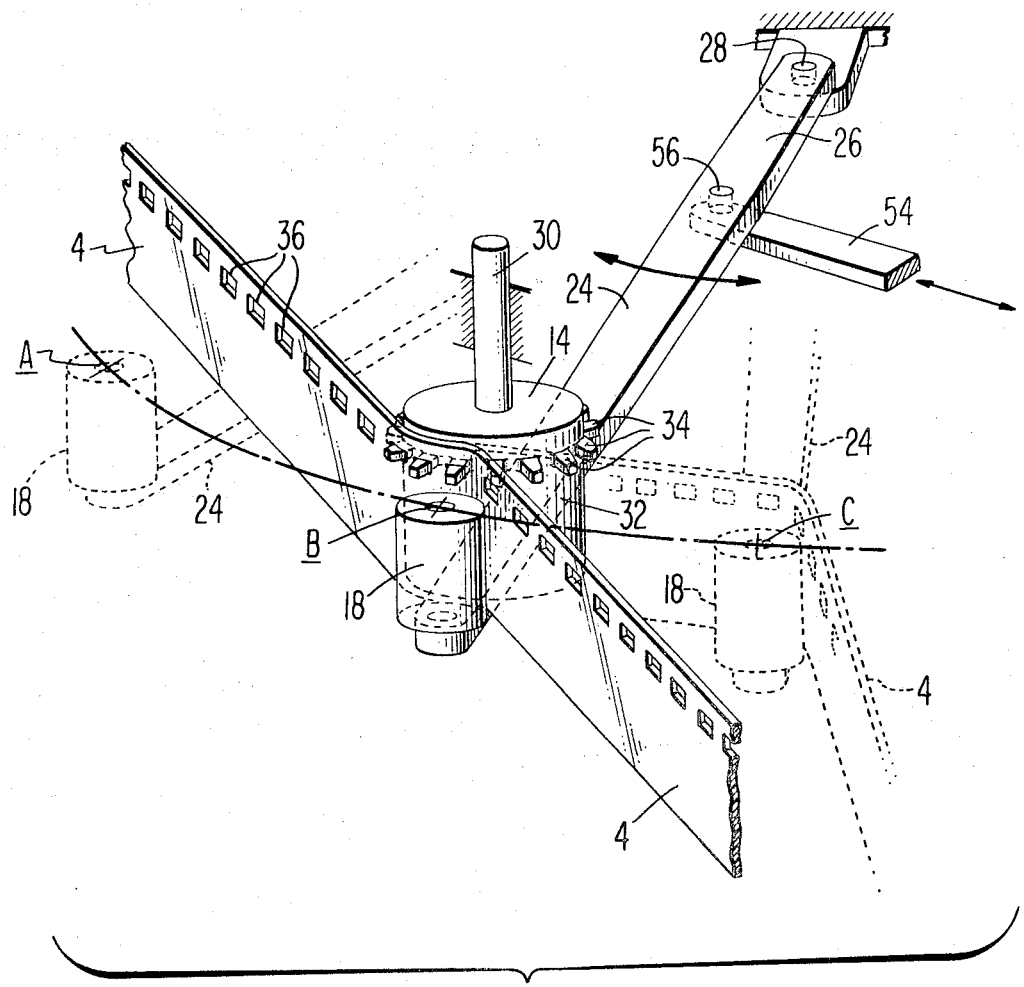
FIG. 2 is a perspective view of a portion of the arrangement shown in FIG. 1.

The cooperative arrangement between the sprocket wheel 14, the guide roller 18 and arm 24 will be further clarified from a consideration of the perspective view of FIG. 2, in which like numbered reference characters correspond with and refer to those shown and described with respect to FIG. 1. The sprocket wheel 14 is mounted for rotation with a shaft 30. The shaft 30 is arranged to provide free rotation of the sprocket wheel 14, in the absence of a motion influencing force applied to the shaft 30. The sprocket wheel 14 has a substantially cylindrical peripheral surface 32 adapted to cooperate with the film 4. Disposed in annular fashion along one edge of the peripheral surface 32 are a plurality of sprocket teeth 34, which cooperate with film sprocket holes 36 to impart motion to the film 4 when the sprocket wheel 14 is rotated.

The roller 18 may be positioned to either side of and beyond the sprocket wheel 14 by means of the pivotal arm 24. In addition as shown in FIG. 2 the roller 18, which is adapted to cooperate with the film 4, may be positioned in tangential contacting relation with the peripheral surface 32 of the sprocket wheel 14, to thereby establish and maintain cooperation between the film 4 and the sprocket wheel 14.

As shown in FIG. 1 the sprocket wheel shaft 30 is coupled to a first portion 40 of a controllable clutch means 42. A further portion of 44 of the clutch means 42 is coupled by means of a shaft 46 to a sprocket drive means 48, the energization of which may be controlled in known manner by means not shown. The clutch means 42 is of a known type which may be selectively controlled, for coupling the shaft 46 with the shaft 30 in response to a signal applied to an input terminal 50 of the clutch means 42.

Position control of the arm 24 is provided by a reciprocating bell crank type mechanism which comprises a rotatable disc 52 and an arm 54. The arm 54 is pivotally coupled at its end 56 to the portion of the arm 24 intermediate its ends 22 and 26. The end 58 of arm 54 is pivotally coupled to the disc 52 by means of an off-centered pin 60. Rotation of the disc 52 is provided through a shaft 62 from a controllable drive means 64. Situated at the periphery of disc 52 for rotation therewith, is a switch actuating means 66. Situated about the periphery of the disc 52, but in spaced relation therewith, is a pair of switching means 68 and 70 at a location denoted A'. There is also a switching means 72 located at a position denoted B' and a further switching means 74 located at a position denoted C'. The switching means 70 and 74 are of a type which is disposed in a normally closed or contacting relation, while switching means 68 and 72 are of a type which are disposed in a normally open or non-contacting relation. The actuating means 66 is located on the periphery of disc 52 such that, when the means 66 is disposed in the position denoted A' the arm 24 positions the roller 18 at its location denoted A. When the actuating means 66 is disposed at position B', the arm 24 positions the roller 18 at its location denoted B, and roller 18 is at the C position when actuating means 66 is disposed at position C'. In the embodiment shown, the switching means 68 through 74 for example may comprise magnetic reed switches with the actuating means 66 being a permanent type magnetic element. In such an arrangement the presence of the actuating means 66 opposite a switching means causes that switching means to assume the converse or opposite state from that in which it is normally disposed. That is, the presence of the actuating means 66 will cause a normally open contact switching means to assume a closed state and conversely a normally open switching means will assume a closed contact state.

An energy source 76 provides rotation of the disc 52 and drive shaft 62 through the drive means 64. The energy source 76 is coupled in series manner to the drive means 64 through the normally closed contacts of both switching means 70 and 74. The energy source 76 is also coupled to the drive means 64 through a further path which includes a normally open switching means 78. The switching means 78 may be of the manually operable type or actuated by automatic means not shown. A signal generator 80, which for example may be a pulse generator, is coupled to a latchable or bistable state device such as the flip flop 82. The flip flop 82, which may be of known type, is arranged to provide at its output 84 a high or given voltage level in response to a signal at its input denoted H, and a zero or low level in response to a signal at its input denoted L. The output 84 is coupled thrugh an amplifier 86 to provide a suitable level for selectively disposing the clutch means 42 in its energized or de-energized state. The output of signal generator 80 is coupled by a first path thrugh the normally open contacts of switching means 68 to the input denoted L of flip flop 82. Signal generator 80 is further coupled through the normally open contacts of switching means 72 to the input denoted H of the flip flop 82. While as stated the switching means 72 is normally disposed in an open contact state, as shown in FIG. 1 the contacts of switching means 72 are closed due to the presence of the actuating means 66.

In operation of the device, the switch actuating means 66 is initially disposed in position A' with the arm 24 correspondingly assuming the position to dispose roller 18 in location A. For this condition the normally open contacts of switching means 68 are closed, thereby providing a signal from the generator 80 through flip flop means 82 and amplifier 86 to maintain the clutch means 42 in its de-energized state, which permits free rotation of the shaft 30 and sprocket wheel 14. Also for this condition the normally closed contacts of switching means 70 are disposed in an open state thereby de-energizing the drive means 64 to maintain the roller 18 in position A. A portion of the film 4, which is arranged to be freely paid out from the supply means 2 by either manual or automatic means not shown, is withdrawn from the film supply 2. The paid out portion of the film 4, denoted by the dashed line 88, extends through the region 17 between and in spaced relation with the roller means 18 and sprocket wheel 14 and is held between the aperture plate 8 and film shoe 10 of the film gate assembly 6.

The switching means 78 may then be momentarily depressed causing the disc 52 to be rotated in a clockwise direction as indicated by the arrows 90. Movement of the disc 52 and thus actuating means 66, permits switching means 70 to assume its normally closed state thereby maintaining drive to the disc 52. Movement of the disc 52 causes actuating means 66 to move from position A' to position B', with the arm 24 correspondingly causing the roller means 18 to move from position A to position B. This movement of the roller means 18 engages the film 4 and disposes it at least partially about and in contacting relation with the sprocket wheel 14. In addition the movement of the roller 18 to position B causes a loop of the film 4 to be formed, which extends from the sprocket wheel 14 about the roller means 18 to the film gate assembly 6. Upon the actuating means 66 assuming the position B' as shown in FIG. 1, the normally open contacts of switching means 72 are closed as shown. The closure of the contacts of switching means 72 causes a signal from generator 80 to be coupled to the input gate of flip flop 82 denoted H. The output thus produced at the output of amplifier 86 energizes the clutch means 42, to thereby inhibit free rotation of the sprocket wheels 14. The contacts of switching means 70 and 74 being in a closed state maintains energization of the drive 64 causing the actuating means 66 to move towards the position C'. Upon the actuating means 66 assuming the position C' the arm 24 correspondingly positions the roller means 18 at position C. The actuating means 66 at position C' causes the normally closed contacts of switching means 74 to be disposed in an open state thereby de-energizing the drive means 64. Thus the roller means 18 is maintained in position C in which it is operative to insure cooperative relation of the film 4 with the sprocket wheel 14. At the same time the formed loop of film 4 is maintained between the sprocket wheel 14 and the film gate assembly 6, thus disposing the film 4 in the desired operative porjection relation with the film projector transport.

When it is desired to remove the film 4 from the operative projection path, switching means 78 is momentarily utilized to energize the drive 64. Rotation of the disc 52 permits continuous energization of the drive 64, until the actuating means 66 reaches the position A' and the arm 24 positions the roller means 18 back at position A. The switch actuating means 66 being disposed in position A', de-energizes drive 64 through switching means 70 and also de-energizes the clutch means 42 through switching means 68 as previously described.

It will be understood that the embodiment shown and described is illustrative and that, variations thereof may be made without departing from the spirit or scope of the invention. For example, the positioning of the roller means 18 may be accomplished by use of such devices as cams, solenoids and pneumatic or hydraulic cylinders. Also the switching means and actuating means may include cam or solenoid operated microswitches or valves, optical means such as photocells, or some form of fluidic, pneumatic or hydraulic device.

What is claimed is:

1. In an arrangement comprising apparatus for transporting a motion picture film over a path between a supply means and a projection station, a guide means, a sprocket means positioned at one side of said path, means for movably mounting said guide means to traverse a continuous path which includes a first position situated on the opposite side of said path, a second position intermediate said sprocket means and said projection station in which said guide means is substantially tangent the periphery of said sprocket means, and a further position to the side of said sprocket means opposite that nearest said path, control means for moving said guide means from said first position through said second position to said further position to thereby dispose said film about said sprocket means and to form a loop of said film between said sprocket means and said projection station, said control means then moving said guide means from said further position to said second position to dispose said guide means tangential the periphery of said sprocket means whereby said film is driveable between said sprocket means and said guide means.

2. In a film transport having first means adapted to receive a supply of film, film gate means spaced from said first means including aperture plate means and film shoe means arranged to hold said film therebetween and rotatable annular sprocket means disposed intermediate said first means and said film gate means, wherein said film when present is disposed in a first region extending from said film supply means to said film gate means and situated on a given side of and in spaced relation with said sprocket means, apparatus for automatically disposing film in operative relation with said transport means, comprising; film guide means including means adapted to cooperate with said sprocket means to maintain coaction of said film with said sprocket means, means for movably mounting said guide means to traverse a continuous path which includes a first position situated on said given side of said sprocket means beyond said first region, a second position intermediate said sprocket means and said film gate means in which said guide means is substantially tangent the periphery of said sprocket means, and a further position to the side of said sprocket means opposite said given side, control means coupled to said mounting means for positioning of said guide means along said path, said control means being operative to sequentially move said guide means from said first position through said second position to said further position to thereby dispose said film when in said first region about said sprocket means and further to form a loop of said film between said sprocket means and said film gate means, said control means being further operative to move said guide means from said further position back to said second position wherein said guide means is disposed in said cooperative relation with said sprocket means.

3. The invention according to claim 2, wherein said control means includes drive means, cyclically moveable means coupled to said drive means, means coupling said cyclically moveable means to said film guide mounting means, switching means, switch actuating means coupled to said cyclically moveable means and responsive thereto for sequentially operating said switching means to selectively energize said drive means and thereby control the position of said guide means.

4. The invention according to claim 2, and further including drive means, controllable clutch means including a first portion coupled to said drive means and a further portion coupled to said sprocket means, and means coupled to said control means and responsive to the operation thereof to enable said clutch means upon said guide means assuming said further position to thereby couple said sprocket means to said drive means.

5. In a film projector transport having first means adapted to receive a supply of film, film gate means spaced from said first means including aperture plate means and film shoe means arranged to hold said film therebetween and rotatable annular sprocket means disposed intermediate said first means and said film gate means, wherein said film is disposed in a first region extending from said film supply means to said film gate means and situated on a given side of and in spaced relation with said sprocket means, apparatus for automatically disposing film in operative projection relation with said transport means, comprising; an elongated arm, a film guide roller adapted to cooperate with said sprocket means to maintain coaction of said film with said sprocket means, means mounting said roller to a first portion of said arm, means mounting said arm at a further portion thereof for pivotal movement of said arm with respect to said first region and said sprocket means, reciprocating means coupled to said arm providing pivotal movement thereof to cause said roller to traverse an arcuate path which includes a first position situated on said given side of said sprocket means beyond said first region, a second position in which said guide roller is disposed in cooperative relation with a peripheral portion of said sprocket means to guide said film thereover, and a further position to the side of said sprocket means opposite said given side, drive means operatively coupled to said reciprocating means, and means for selectively energizing said drive means to sequentially position said guide roller along said arcuate path.

6. The invention according to claim 5, including means for rotatably mounting said sprocket means providing free bidirectional rotation thereof, selectively operable means coupled to said sprocket mounting means and operable in a first condition thereof to inhibit free rotation of said sprocket means, and means responsive to the operation of said reciprocating means to dispose said selectively operable means in said first condition upon said roller being positioned in said further position by said arm.

* * * * *